Figure 1:
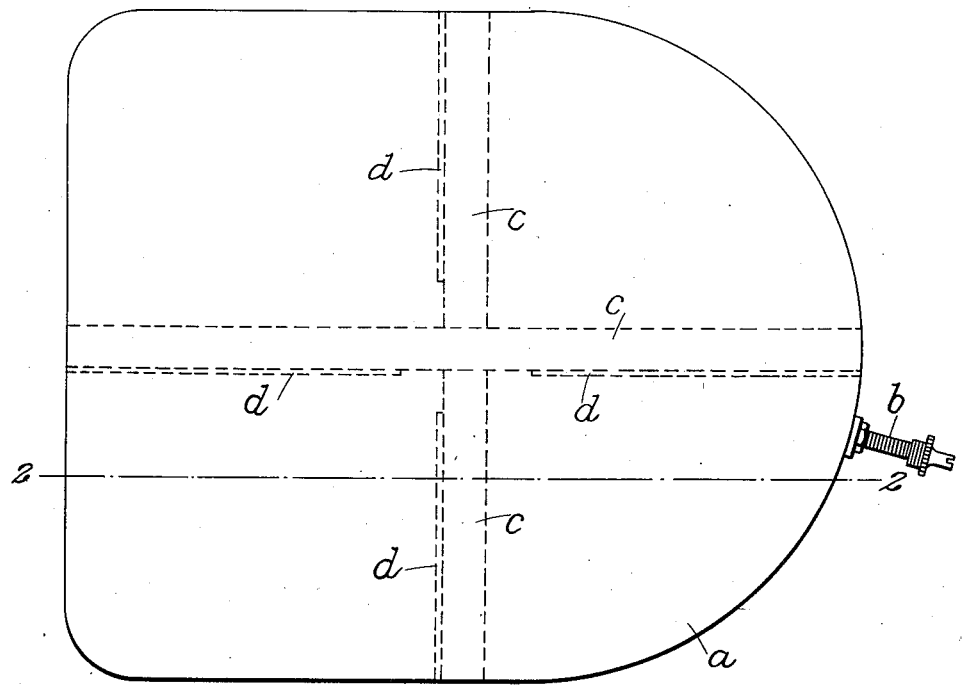

March 10, 1931.  H. A. HOWARD  1,795,304

SEAT, BEDDING, CUSHION, AND UPHOLSTERY

Filed Feb. 20, 1929  2 Sheets-Sheet 1

INVENTOR:
Harold Arthur Howard
BY: Ruez, Boyn & Bakelau
ATTORNEYS.

March 10, 1931. H. A. HOWARD 1,795,304
SEAT, BEDDING, CUSHION, AND UPHOLSTERY
Filed Feb. 20, 1929  2 Sheets-Sheet 2

INVENTOR:
Harold Arthur Howard
BY: Ring, Boyn & Bakelew
ATTORNEYS.

Patented Mar. 10, 1931

1,795,304

UNITED STATES PATENT OFFICE

HAROLD ARTHUR HOWARD, OF SURBITON, ENGLAND, ASSIGNOR TO SORBO RUBBER SPONGE PRODUCTS LIMITED, OF WOKING, ENGLAND

SEAT, BEDDING, CUSHION, AND UPHOLSTERY

Application filed February 20, 1929, Serial No. 341,371, and in Great Britain August 10, 1928.

This invention relates to air cushions for seats, bedding and upholstery, of the kind in which the displacement of air within the cushion is restricted by the cushion being divided into inter-leaking compartments, for the purpose of reducing rolling of a person seated on or bearing against the cushion due to the rapid transfer of the supporting effect of the contained air.

To prevent the too rapid transfer of the supporting effect of air in an air cushion, it is not merely sufficient to restrict the passage of air from one portion of the cushion to another, too rapid transfer of the pressure of the air must also be prevented. For instance, actual transfer of air from one part of an air cushion to another can be prevented by subdividing the air cushion by means of air proof partitions, which if deliberately or accidentally leaky would restrict, instead of prevent, the transfer of air. However the support provided by such air would be readily transferred by the partitions bulging and instantaneously transmitting to the exterior or to the next compartment the pressure of the air.

The air cushion of the present invention provides not only restriction of the transfer from one portion to another of air contained therein but also restriction of the transfer from one portion to another of the pressure of such air.

According to the present invention, the interior of an air cushion, divided into compartments by means of porous partitions permitting slow transfer of air, is so divided by porous partitions of a structure non-yielding to lateral air pressure.

A suitable material for the partitions is stout spongy or porous rubber, which, to restrict passage of air more than by the resistance offered in passing through the cellular structure of the rubber may be partially faced with more or less impermeable rubber.

Alternatively the partitions may be spaced apart double canvas or ordinary thin sheet rubber walls with the intervening space packed with a stuffing material such as kapok. The impermeability of canvas walls can be increased by rubber frictioning, and conversely the deliberately desired leakiness thereof and of rubber sheeting if not sufficiently porous can be provided by suitable perforations.

Representative examples of structures of air cushion according to the invention are illustrated on the accompanying drawing, in which:—

Figure 2:
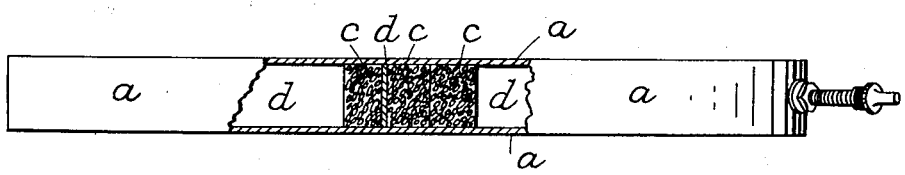
Figure 3:
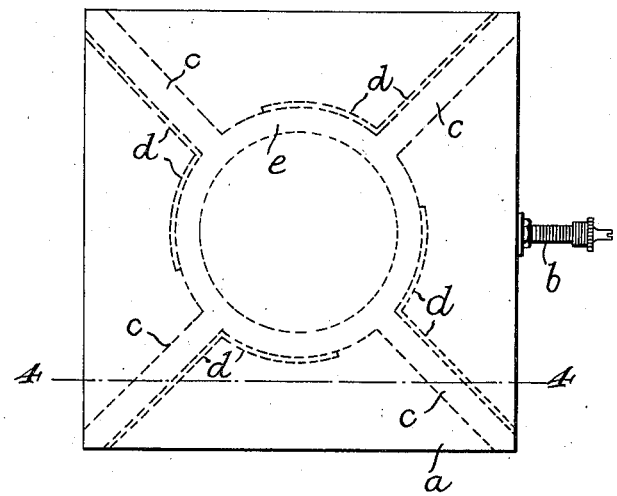
Figure 5:
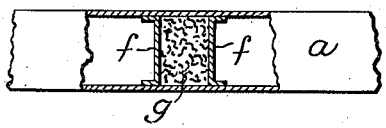
Figure 6:
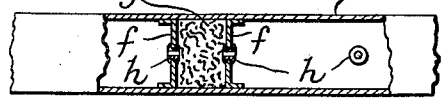

Fig. 1 is a plan and
Fig. 2 an edge view partly in cross section on the line 2—2 of Fig. 1, of one form of construction of air cushion.
Fig. 3 is a plan and
Fig. 4 an edge view partly in cross section on the line 4—4 of Fig. 3 of another construction.
Figs. 5 and 6 are sections illustrating modifications.

Referring more particularly to Figs. 1 and 2, $a$ is the rubber envelope of the air cushion. $b$ is the inflation valve.

$c$ are thick strips of spongy rubber arranged in cross formation and cemented to the rubber envelope $a$ so as to divide the interior of the air cushion into compartments.

One lateral face of each sponge rubber partition $c$ is faced with sheet rubber $d$ except for a small area, for the purpose of restricting passage of air through the partitions.

Figure 4:
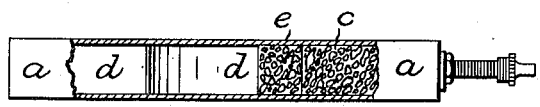

The air cushion shown in Figs. 3 and 4, differs, apart from shape and size from that of Figs. 1 and 2, merely by there being an annular middle sponge rubber partition $e$ provided through which the air must leak past the ends of the facing rubber $d$ in passing from one side of a partition $c$ to the other side thereof.

Fig. 5 shows a partition for an air cushion built up of duplex spaced apart canvas or thin sheet rubber walls $f$ with the intervening space packed with kapok $g$ or other similar upholstery stuffing.

If the walls $f$ are too impervious one or more eyeletted or other perforations $h$ can be provided in each double walled partition as shown in Fig. 6.

In all cases the thickness of the sponge rubber partitions $c$ and $e$ and of the built-up partitions $f$ $g$, is such as to prevent transfer of the air pressure from one compartment to the next by the partition bulging.

I claim:

In an air cushion, a rubber envelope of said air cushion, stout spongy rubber partitions cemented to said rubber envelope dividing said air cushion into compartments, and sheet rubber facings almost entirely covering at least one lateral face of each of said spongy rubber partitions.

In testimony whereof I have signed my name to this specification.

HAROLD ARTHUR HOWARD.